(12) United States Patent
Arias et al.

(10) Patent No.: US 7,177,394 B2
(45) Date of Patent: Feb. 13, 2007

(54) CONNECTION ARCHITECTURE FOR XDSL NETWORKS AND INTERMEDIATE DISTRIBUTION FRAME FOR SAID ARCHITECTURE

(75) Inventors: Juan Tomas Arias, Alcobendas Madrid (ES); Jose Manuel Jorde, Valencia (ES)

(73) Assignee: Tyco Electronics Raychem SA (ES)

( * ) Notice: Subject to any disclaimer, the term of this patent is extended or adjusted under 35 U.S.C. 154(b) by 357 days.

(21) Appl. No.: 10/501,365

(22) PCT Filed: Jan. 15, 2003

(86) PCT No.: PCT/GB03/00193

§ 371 (c)(1),
(2), (4) Date: Jul. 14, 2004

(87) PCT Pub. No.: WO03/063460

PCT Pub. Date: Jul. 31, 2003

(65) Prior Publication Data

US 2005/0018818 A1    Jan. 27, 2005

(30) Foreign Application Priority Data

Jan. 22, 2002    (ES) ............................... 200200130

(51) Int. Cl.
*H04M 1/24*    (2006.01)
*H04M 3/08*    (2006.01)
*H04M 3/22*    (2006.01)

(52) U.S. Cl. ............... 379/1.03; 379/26.01; 379/93.05; 379/325; 379/399.01; 379/413.04

(58) Field of Classification Search ...... 379/1.01–1.04, 379/9.06, 22.05–22.07, 26.01, 28, 29.01, 379/399.01, 413.02, 93.05, 325, 413.04
See application file for complete search history.

(56) References Cited

U.S. PATENT DOCUMENTS 5,402,515 A * 3/1995 Vidacovich et al. ........ 385/135

(Continued)

FOREIGN PATENT DOCUMENTS

WO    01/65816    9/2001

(Continued)

OTHER PUBLICATIONS

International Preliminary Examination Report for PCT/GB03/00193, (Jul. 29, 2003).

(Continued)

*Primary Examiner*—Binh K. Tieu
(74) *Attorney, Agent, or Firm*—Myers Bigel Sibley & Sajovec

(57) ABSTRACT

The connection architecture is configured to digitally monitor filters therein, directly connecting a test table to the intermediate distribution frame without requiring wiring to the DSLAM. Filter cards of the dominant operators and of second operators, at least one smart card containing the relays that are activated from the test table, for which a digital bus is used, allowing measurement of the subscriber loop for filters of second operators and the DSLAM signal as well for the dominant operator, are further provided with an additional card in charge of receiving and distributing the signal that arrives from the DSLAM, between the filters, and connectors to which are connected the filter cards so that when they are extracted, the input (voice) is connected to the output (voice +data) so that the voice signal is not disconnected.

12 Claims, 2 Drawing Sheets

U.S. PATENT DOCUMENTS

| | | | |
|---|---|---|---|
| 6,438,226 B1 * | 8/2002 | Guenther et al. | 379/413.04 |
| 6,768,794 B1 * | 7/2004 | Morgenstern | 379/325 |
| 6,819,745 B2 * | 11/2004 | Hollenbeck et al. | 379/1.03 |
| 6,826,280 B1 * | 11/2004 | Sajadi et al. | 379/413.04 |
| 2004/0120508 A1 * | 6/2004 | Sajadi et al. | 379/399.01 |
| 2006/0072892 A1 * | 4/2006 | Serrander et al. | 385/135 |
| 2006/0176825 A1 * | 8/2006 | Huang et al. | 370/241 |
| 2006/0177042 A1 * | 8/2006 | Fadler et al. | 379/327 |

FOREIGN PATENT DOCUMENTS

| | | |
|---|---|---|
| WO | 01/93548 | 12/2001 |

OTHER PUBLICATIONS

International Search Report for PCT/GB 03/00193, (Jul. 29, 2003).

* cited by examiner

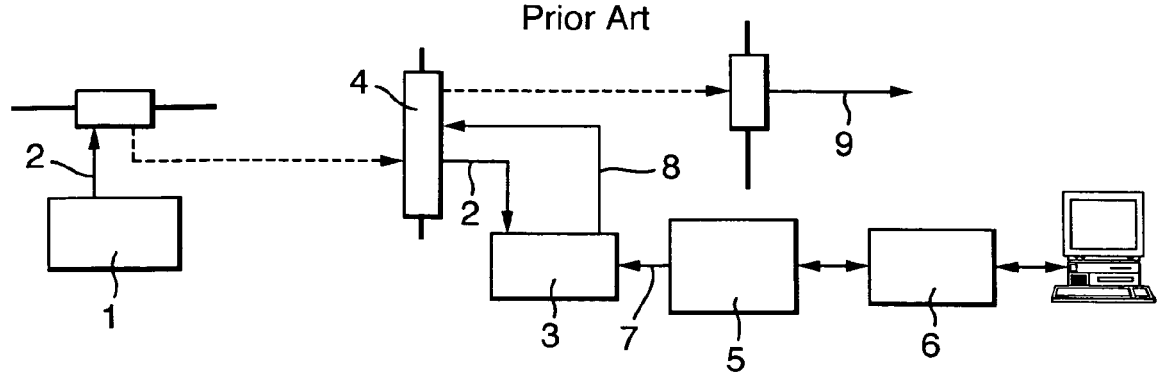
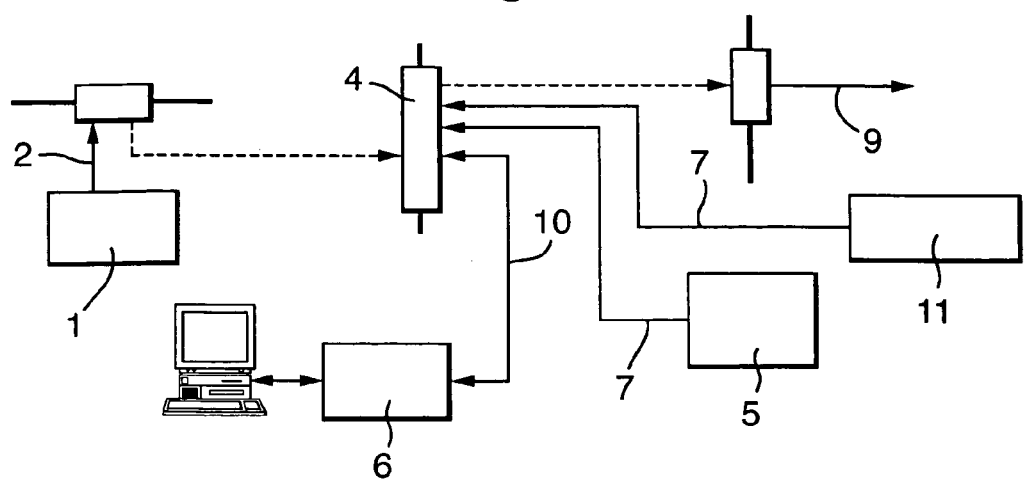

CONNECTION ARCHITECTURE FOR XDSL NETWORKS AND INTERMEDIATE DISTRIBUTION FRAME FOR SAID ARCHITECTURE

RELATED APPLICATIONS

The present application is a National Phase application of PCT/GB03/000193 filed on Jan. 15, 2003 and published in English, which claims priority from Spanish Application P200200130 filed on Jan. 22, 2002, the disclosure of which is incorporated herein by reference.

BACKGROUND OF THE INVENTION

The present invention relates to both the connection architecture for XDSL networks and to the intermediate distribution frame for such architecture.

In order to provide a high-speed data transmission service, such as by an ADSL line (Asymmetric Digital Subscriber Line) or in general xDSL, it is necessary to either join or separate the voice signal, sent by the switching exchange, and the high speed xDSL data signal supplied by the digital subscriber line access multiplexor (DSLAM) by means of a filter or splitter which sums or separates the signals depending on whether they are going to or coming from the subscriber.

The object of the present invention is to develop a connection architecture for xDSL networks that allows to place the filters or splitters in an intermediate distribution frame and to digitally monitor these filters at the intermediate distribution frame automatically, so that no wiring is required, which task is a complex one. In addition the text table is connected to the intermediate distribution frame independently of the DSLAM.

Therefore, the present invention lies within the scope of telephony and more specifically within the connection systems for xDSL lines, as well as the means required to effect these connections.

As mentioned before, providing a high speed data service such as by an ADSL line requires joining the voice signal which arrives from the switching central to the xDSL high-speed signal provided by the digital subscriber line access multiplexor (DSLAM), that is, the device which provides access to high-speed lines. The summing or separation is effected by a splitter normally installed together with the DSLAM in the same electronic components cabinet.

Given the high cost of the DSLAM and splitter joint equipment, certain operators have preferred to purchase the components separately and to install the splitters and the DSLAM in different cabinets. This solution has a number of drawbacks, such as:

The wiring must be double, from the intermediate distribution frame and the splitter cabinet in order to sum both signals, voice and xDSL, and then again to the intermediate distribution frame.

The test table must be connected to both the splitters and to the DSLAM.

A switching matrix is required at the DSLAM and another at the splitter area in order to disable the splitters and signals to carry out measurements.

Not all DSLAMs allow a switching matrix.

Wiring between the splitters and the test table is complex and difficult to effect, particularly each time there are extensions.

A demarcation point is required to measure the DSLAM side and the subscriber loop side, requiring a cutting and test point in the splitter area.

Wiring is required between the cabinet housing the DSLAM and that housing the splitters, and between the switching exchange and the intermediate distribution frame, specifically with the vertical and horizontal sides.

An intermediate distribution frame is required at the bridge to the vertical and horizontal side, further requiring a fixed wiring to the DSLAM.

If the test table is installed at the DSLAM only the dominant operator lines can be measured, so that it is not possible to measure the status of a line rented to a different operator.

Later and in order to solve part of the aforementioned drawbacks, nowadays and in certain cases the splitters have been integrated into the intermediate distribution frames, simplifying the wiring but with drawbacks remaining, such as:

The test table requires a switching matrix at the DSLAM and another at the splitter area.

Not all current DSLAMs allow a switching matrix.

A demarcation point is required to measure the DSLAM side and the subscriber loop side.

The wiring between the test table and the intermediate distribution frame is complex.

Therefore, the object of the present invention is to provide a connection architecture which avoids the above described drawbacks, for which an intermediate distribution frame is provided which houses intelligent filters that can be monitored digitally, and therefore automatically, directly from the test table without requiring the use of a switching matrix at the DSLAM. Said monitoring is effected by a digital bus which can activate all measuring points of the various lines by a bus with a low number of wires, thereby greatly simplifying the wiring. Additionally, the test table is independent of all DSLAMs, so that it can measure both the lines of the dominant operator and those rented to other operators.

SUMMARY OF THE INVENTION

The disclosed invention for a connection architecture or XDSL networks and the intermediate distribution frame required for this architecture consists of achieving an architecture in which the filters are integrated in the intermediate distribution frame, thereby simplifying the required wiring. In addition, the test table is independent of any type of DSLAM, so that the use of switching matrices in the DSLAM is not required.

As an option it is possible to automatically monitor the filters by means of a smart card with relays that are activated by the test table, with the card being controlled by a digital bus with a low number of lines. This card can be installed at a later time, when the number of filters is so great that manual measuring becomes an onerous task. Adding the card does not involve an reconfiguration, simply adding services.

These smart cards that can be added later allow to obtain a demarcation point in which to measure the DSLAM and the subscriber loop sides, thereby allowing to install filters of other operators, with these filters configured so that only the subscriber loop and not the DSLAM side loop can be verified, as this corresponds to the second operator. This allows to integrate filters of other operators in the same intermediate distribution frame and with the same system.

Therefore the advantages of the current configuration is a greater and better operation, as the filters can be monitored automatically, the test table is independent of the DSLAMs, and costs are reduced by eliminating wiring from the test table to the DSLAM and the use of a switching matrix, while space is saved as it allows to place the filters of the dominant operator and those of other operators in the same intermediate distribution frame.

As regards the intermediate frame it will be configured such that it houses the filter cards for both the dominant operator and others, with these filter cards containing the configuration required to perform measurements on the DSLAM side and on the subscriber loop or only on the subscriber loop, as required.

Additionally, on said intermediate distribution frame is housed at least one smart card that contains relays activated by the test table allowing to digitally monitor the subscriber loop for second operators and the DSLAM side as well for the dominant operator. This card is only installed when wanting to perform automatic measurements from the test table. The card is controlled by a digital bus which can activate all measurement points.

The digital bus is provided with two measurement wires, another two wires for power supply to the relays and as many wires as required to activate all the measurement points.

Connection of the filter cards will be achieved by connectors which when extracted connect directly the input (voice) and the output (voice and data) so that the voice is not disconnected and the service is not interrupted at the card removed.

DESCRIPTION OF THE DRAWINGS

As a complement to the description of the invention which will be made below and in order to aid a better understanding of its characteristics the present descriptive memory is accompanied by a set of drawings in which for purposes of illustration only and in a non-limiting sense the most significant details of the invention are shown.

FIG. 1 shows a configuration scheme where the filter is separated from the DSLAM but in which the test table acts through the DSLAM.

FIG. 2 shows the configuration scheme proposed herein in which the test table is independent of the DSLAM, allowing to place filters of other operators and to digitally monitor all filters automatically.

DETAILED DESCRIPTION OF EMBODIMENTS OF THE INVENTION

Figure 3:
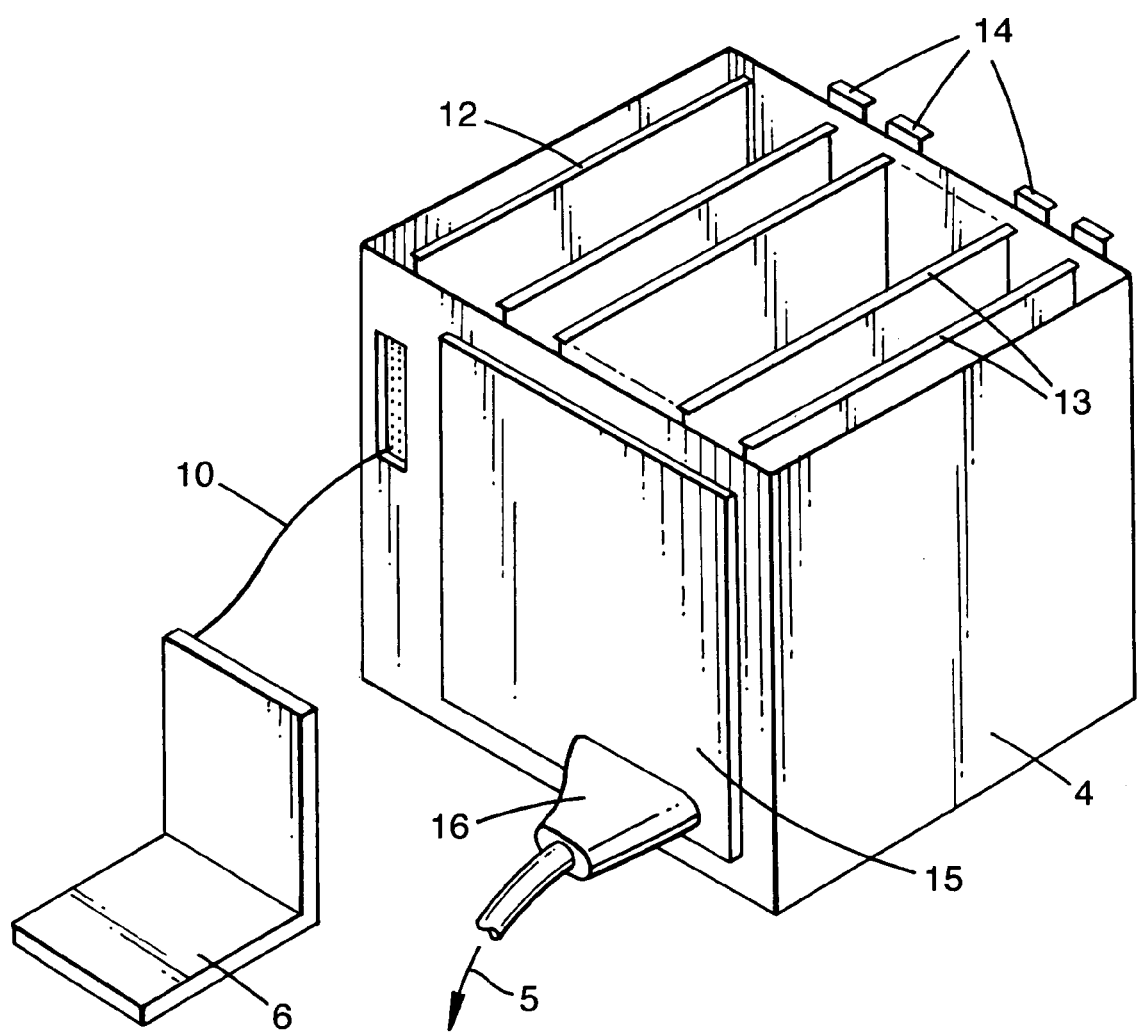
FIG. 3 shows a schematic representation of the intermediate distribution frame required to provide the connection architecture for XDSL networks.

In view of the aforementioned figures a description is provided below of a preferred embodiment for the invention, as well as an explanation of the drawings.

FIG. 1 shows how the switching exchange (1) supplies the voice signal (2), which passes through the intermediate distribution frame (4) and reaches the filter or splitter (3) meant to join or separate the voice signal (2) and the high speed xDSL signal (7) provided by the digital subscriber line access multiplexor (DSLAM) (5), obtaining the signal (8) that then reaches the intermediate distribution frame (4) again and continues to the subscriber (9). The test table (6) is connected to the DSLAM and is not independent of it, so that in order to perform measurements on the filters two switching matrices are required, as well as the corresponding wiring between the filters (3) and the test table (6), which is complex and difficult to perform every time extensions are required. Also necessary is the corresponding wiring between the DSLAM (5) and the filters (3).

In FIG. 2 one can see the proposed solution for a connection architecture for XDSL networks, which allows digital and therefore automatic monitoring of the filters, avoids wiring and makes independent the text table (6) from the DSLAM (5), allowing to place second operators (11). Said figure shows how the test table (6) is independent from the DSLAM (5), sand is connected directly to the intermediate distribution frame (4), by means of a digital bus (10), thereby allowing the entrance of second operators (11).

FIG. 3 shows the intermediate distribution frame required for the above described configuration. This intermediate distribution frame (4) is internally provided with a number of filter cards (13), which may belong to the dominant operator or to other operators, and leaves space available for at least one smart card (12) which may be added later to provide a demarcation point for measuring either the subscriber side in the case of a second operator or both the subscriber line and the DSLAM line for the dominant operator.

This smart card contains relays that are activated from the test table (6), allowing to automatically monitor the filters (13), for which purpose the smart card (12) and the test table (6) are connected by a digital bus (10) which encompasses the intermediate distribution frames. This digital bus (10) is provided with at least two wires for power supply to the relays, another two for the signal and as many wires as required to activate all the measuring points, thereby eliminating the wiring between the filters and the test table and the use of two switching matrices.

The connections of the filter cards (13) are effected by the connectors (14) that allow to maintain the voice signal when the cards are extracted, as the voice is directly connected to the output, with voice and data available when connected. The high speed xDSL signal provided by the DSLAM (5) arrives through a connector (16), which can provide a service to as many cards as may be installed by means of an additional card or backplane (15).

It will be understood by those skilled in the art that the present invention is not limited to the embodiments shown and that many additions and modifications are possible without departing from the scope of the present invention as defined in the following claims.

The invention claimed is:

1. A connection architecture for XDSL lines comprising:
   filters and/or splitters located in an intermediate distribution frame;
   a test table connected directly to the intermediate distribution frame independently of digital subscriber line access multiplexor (DSLAM); and
   at least one smart card installed in the intermediate distribution frame with the filters and/or splitters therein, the at least one smart card being configured to connect the test table to the intermediate distribution frame, the at least one smart card containing devices that can be activated from the test table to digitally and automatically monitor the filters and/or splitters.

2. A connection architecture according to claim 1, wherein said at least one smart card is configured to allow monitoring of a subscriber loop of filter cards associated with lines associated with other operators, and to allow monitoring of both a subscriber loop and a DSLAM signal for lines associated with a dominant operator.

3. A connection architecture according to claim 1, wherein said filters and/or splitters are associated with a first operator and wherein said at least one smart card is configured to place filters of at least one second operator in the intermediate distribution frame.

4. A connection architecture according to claim 1, wherein said at least one smart card is actuated from the test table using a digital bus.

5. A connection architecture according to claim 4, wherein said digital bus includes two power wires, two measurement wires and wires for activating all measurement points.

6. An intermediate distribution frame for a connection architecture for XDSL lines, comprising:
   a frame;
   filter and/or splitter cards in the frame;
   at least one smart card configured to allow digital monitoring of filters associated with the filter and/or splitter cards;
   output connectors; and
   an additional card and/or backplane including a connector configured to recieve a signal from a digital subscriber line access multiplexor (DSLAM).

7. An intermediate distribution frame as claimed in claim 6, wherein said at least one smart card contains devices which are activated from a test table.

8. An intermediate distribution frame as claimed in claim 6, wherein said at least one smart card is configured to allow monitoring of a subscriber loop associated with at least one of the filter and/or splitter cards that is associated with a non-dominant operator and monitoring of both a subscriber loop and a DSLAM signal associated with at least one of the filter and/or splitter cards that is associated with a dominant operator.

9. An intermediate distribution frame as claimed in claim 6, wherein the filter and/or splitter cards are associated with a dominant operator and wherein the at least one smart card is configured to receive filters of at least one second operator to place the filters of the at least one second operator in the frame.

10. An intermediate distribution frame as claimed in claim 6, further comprising a digital bus configured to couple said at least one smart card to a test table used to actuate the at least one smart card.

11. An intermediate distribution frame according to claim 10, wherein said digital bus includes two power supply wires, two measurement wires and wires to activate all measurement points.

12. An intermediate distribution frame according to claim 6, wherein the filter and/or splitter cards are connected to the frame by connectors configured to, when an associated one of the filter and/or splitter cards are extracted, connect a voice input signal directly to a combined voice and data output signal so that a voice service associated with the extracted card is not disconnected.

* * * * *